(12) United States Patent
Fröberg Olsson et al.

(10) Patent No.: US 10,992,440 B2
(45) Date of Patent: Apr. 27, 2021

(54) WIRELESS DEVICE AND METHOD THEREIN FOR DETERMINING A SEARCH SPACE IN A WIRELESS COMMUNICATIONS NETWORK

(71) Applicant: Telefonaktiebolaget LM Ericsson (publ), Stockholm (SE)

(72) Inventors: Jonas Fröberg Olsson, Ljungsbro (SE); Erik Eriksson, Linköping (SE); Pål Frenger, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 101 days.

(21) Appl. No.: 16/345,323

(22) PCT Filed: Nov. 17, 2016

(86) PCT No.: PCT/SE2016/051139
§ 371 (c)(1),
(2) Date: Apr. 26, 2019

(87) PCT Pub. No.: WO2018/093304
PCT Pub. Date: May 24, 2018

(65) Prior Publication Data
US 2019/0312707 A1    Oct. 10, 2019

(51) Int. Cl.
*H04L 5/00* (2006.01)
*H04L 1/00* (2006.01)
*H04W 56/00* (2009.01)

(52) U.S. Cl.
CPC .......... *H04L 5/0053* (2013.01); *H04L 1/0038* (2013.01); *H04L 1/0045* (2013.01); *H04L 5/0048* (2013.01); *H04W 56/0015* (2013.01)

(58) Field of Classification Search
None
See application file for complete search history.

(56) References Cited

U.S. PATENT DOCUMENTS 10,264,437 B2 * 4/2019 Poitau ............... H04W 72/0446
2016/0345206 A1   11/2016 Yerramalli et al.
(Continued)

FOREIGN PATENT DOCUMENTS

| EP | 2509378 A1 | 10/2012 |
| EP | 2683098 A2 | 1/2014 |
| WO | WO 2011/032035 A2 | 3/2011 |

OTHER PUBLICATIONS

International Search Report and Written Opinion of the International Searching Authority, PCT/SE2016/051139, dated Jul. 3, 2017, 12 pages.

(Continued)

*Primary Examiner* — Diane L Lo
(74) *Attorney, Agent, or Firm* — Sage Patent Group

(57) ABSTRACT

A method performed by a wireless device for determining a search space for a physical control channel in a wireless communications network is provided. The wireless device is configured with a first search space of a physical control channel which first search space is associated with a first synchronization signal. The wireless device attempts to receive the first synchronization signal from a first network node. The wireless device then determines a search space for a physical control channel based on whether or not the attempt to receive said first synchronization signal was successful. When the attempt to receive said first synchronization signal was successful determining a first search space for the physical control channel, and when the attempt to receive said first synchronization signal was not successful determining a second search space for any one or more (Continued)

out of: the physical control channel and a second physical control channel.

19 Claims, 9 Drawing Sheets

(56) References Cited

U.S. PATENT DOCUMENTS

2017/0223670 A1* 8/2017 Chen .................... H04L 5/0048
2019/0081832 A1* 3/2019 Marinier ............... H04L 5/0053

OTHER PUBLICATIONS

European Search Report for European Patent Application No. EP 16921639.7, dated Oct. 28, 2019, 3 Pages.
Huawei et al., "DMRS sequences for ePDCCH", 3GPP TSG RAN WGI meeting #68, Dresden, Germany, Feb. 6-10, 2012, R1-120045, 7 Pages.

* cited by examiner

WIRELESS DEVICE AND METHOD THEREIN FOR DETERMINING A SEARCH SPACE IN A WIRELESS COMMUNICATIONS NETWORK

CROSS REFERENCE TO RELATED APPLICATIONS

This application is a 35 U.S.C. § 371 national stage application of PCT International Application No. PCT/SE2016/051139 filed on Nov. 17, 2016, the disclosure and content of which is incorporated by reference herein in its entirety.

TECHNICAL FIELD

Embodiments herein relate to a wireless device and a method therein. In particular, they relate to determining a search space for a physical control channel.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In many wireless communication networks Reference Signals (RSs) play a crucial role to obtain good performance. In LTE, network nodes transmit Primary Synchronization reference Signals (PSS) and Secondary Synchronization reference Signals (SSS) which are used by wireless devices to obtain radio frame, subframe, slot and symbol synchronization in time and frequency domain of a channel such as a control channel. In particular the frequency synchronization from PSS and SSS are further used to identify a center frequency of the carrier to enable a correct resource mapping of system information, random access procedure and the control channel. Cell-specific Reference Signals (CRS) where in early releases of the LTE standard used to determine both large scale channel properties as well as fine-grained channel estimation in a demodulation of a received signal. LTE later developed a support possibility to transmit data and control information to a wireless device from potentially multiple transmission points such as network nodes. To enable this without performance degradation the concept of Quasi-Co-Location (QCL) was introduced. Simplified described, two signals are said to be quasi-co-located with respect to a specific set of radio parameters if the specific set of radio parameters for the two signals can be considered equal. For example, signals transmitted from the same antenna may be considered to have equal delay spread, Doppler spread, Doppler shift, average gain, and average delay. The two signals may therefore be said to be quasi-co-located with respect to these radio parameters. Another example is that signals transmitted from two antennas mounted on the same antenna site may be considered to have same Doppler spread and Doppler shift when received by a wireless device and the two signals are hence said to be quasi-co-located with respect to Doppler spread and Doppler shift.

An evolved Physical Downlink Control Channel (ePDCCH) that appeared in Release 11 of the 3GPP specification enabled transmission from transmission points being different from transmission point for the CRS. This was accomplished by a possibility to configure up to two ePDCCH sets where each of the ePDCCH sets can be quasi-co-located with different Channel State Information Reference Signals (CSI-RS) which are configured to be quasi-co-located with the same or different CRSs. Hence, the ePDCCH relies on the CRSs to obtain good performance. Each of the ePDCCH sets has a search space wherein a wireless device is configured to search for Downlink Control Information (DCI) messages. The wireless device hence determines a union search space comprising the union of search spaces, i.e. the set of search space entries belonging to either or both of the search spaces for the configured ePDCCH sets. For each ePDCCH set and each search space entry the wireless device obtains channel properties from CRSs and CSI-RSs which it uses in a demodulation method for a blind decoding attempt of a possible DCI transmitted in said search space entry. Each ePDCCH supports multiple formats and the format used is a priori unknown to the wireless device. The wireless device needs to blindly detect the format of the ePDCCHs by performing a decoding attempt for each of the possible formats. In each subframe, the wireless device will attempt to decode all the ePDCCHs that can be formed from the CCEs in each of its search spaces.

FIG. 1 shows a simplified illustration how a Wireless device determines a search space to perform blind decoding attempt according to prior art. In FIG. 1, synchronization signals SS1 and SS2 are two pairs of signals each comprising a CRS and a CSI-RS signal, used to obtain fine synchronization, i.e., obtain large scale channel properties. The CRSs are transmitted every subframe while the CSI-RS are also periodic but transmitted with a larger periodicity. In this document they are regarded them as two synchronization signals for simplicity. In this example it is desired to transmit data to the Wireless device from two different cells represented here by Network node 1 and Network node 2. The two network nodes 1 and 2 periodically send 11, 12 their own pair of CRS and CSI-RS signals, Network node 1 transmits SS1 while Network node 2 transmits SS2. The two CRSs may be the same CRS also. To enable the Wireless device to receive DCI messages from both Network node 1 and Network node 2, the Wireless device is configured with two ePDCCH sets with search spaces S1 and S2 respectively. As mentioned above, each of the ePDCCH sets are configured to be quasi-co-located with a CSI-RS, and a CRS, which means that the search spaces are associated with a synchronization (sync) signal. In FIG. 1, search space S1 is configured to be associated with synchronization signal SS1 while search space S2 is associated with synchronization signal SS2. Once the Wireless device is configured with the search spaces and has obtained 13 them it may in each subframe determine 14 a union search space and search 15, i.e. blindly decode 16, for a DCI in search space entries of S1 and S2. When performing a blind decoding attempt for a search space entry in S1 the wireless device uses 17 a demodulation method based on SS1 and when performing a blind decoding attempt for a search space entry in S2 the Wireless device uses a demodulation method based on SS2. In the example illustrated in the figure the Wireless device will determine a successful blind decoding attempt in search space entry x in S2.

There are several problems with the prior art method described above.

It relies on CRSs and CSI-RS that need to be periodically transmitted. Always-on signals such as CRSs are un-desirable for energy efficiency, interference, and forward compatibility reasons.

In future systems, such as e.g. Fifth Generation (5G) New Radio (NR), there will likely be requirements that the wireless device is capable of receiving control messages from a lot of network nodes. Configuring the wireless device with a search space for each network node that it need to receive control messages from will rapidly result in that the wireless device need to perform a huge number of decoding attempts.

However, performing decoding attempts will consume a lot of resources in the wireless device.

SUMMARY

It is therefore an object of embodiments herein to provide a more efficient method to receive control messages to a wireless communications network to improve the performance of a wireless communications network.

According to a first aspect of embodiments herein, the object is achieved by a method performed by a wireless device for determining a search space for a physical control channel in a wireless communications network. The wireless device is configured with a first search space of a physical control channel which first search space is associated with a first synchronization signal. The wireless device attempts to receive the first synchronization signal from a first network node. The wireless device then determines a search space for a physical control channel based on whether or not the attempt to receive said first synchronization signal was successful. The determining is performed such that:

When the attempt to receive said first synchronization signal was successful determining a first search space for the physical control channel, and when the attempt to receive said first synchronization signal was not successful determining a second search space for any one or more out of: the physical control channel and a second physical control channel.

According to a second aspect of embodiments herein, the object is achieved by a wireless device for determining a search space for a physical control channel in a wireless communications network. The wireless device is configured with a first search space of a physical control channel. The first search space is associated with a first synchronization signal. The wireless device being configured to:

attempt to receive from a first network node, the first synchronization signal, determine a search space for a physical control channel based on whether or not the attempt to receive said first synchronization signal was successful, and determine a first search space for the physical control channel, when the attempt to receive said first synchronization signal was successful determine a second search space for any one or more out of: the physical control channel and a second physical control channel when the attempt to receive said first synchronization signal was not successful.

The wireless device determines a search space based on a receiving attempt of the first synchronization signals. This means that the wireless device only determines the first search space for the physical control channel if it really succeeds with receiving the first synchronization signal. This results in that complexity and resource consumption in the wireless device is decreased, which in turn will improve the performance of the wireless communications network.

BRIEF DESCRIPTION OF THE DRAWINGS

Examples of embodiments herein are described in more detail with reference to attached drawings in which.

DETAILED DESCRIPTION

Figure 1:
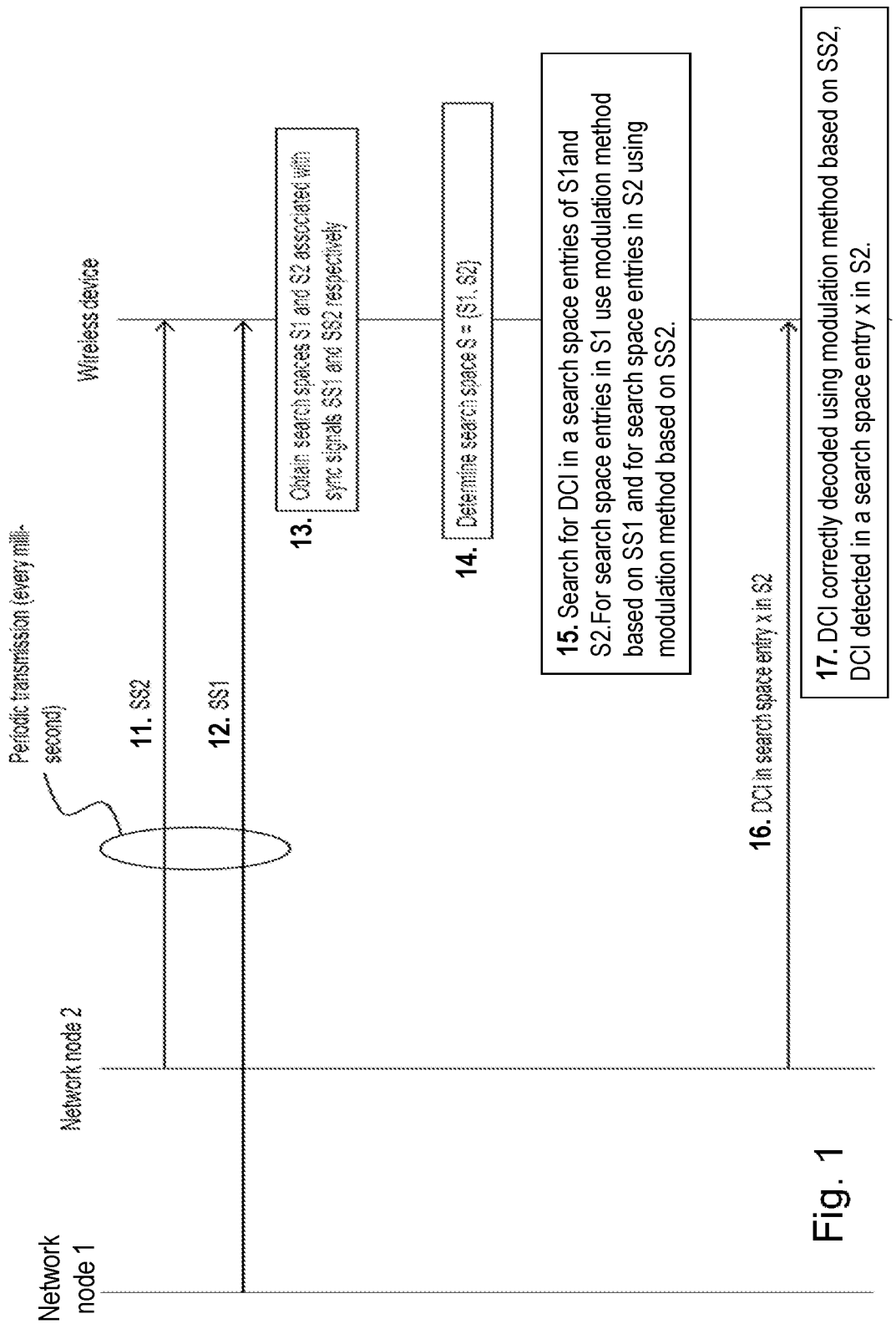
FIG. 1 is a signalling diagram illustrating prior art.

As part of developing embodiments herein a problem will first be identified and discussed.

According to prior art a wireless device always performs a receiving of a first synchronization signal although there may not be any signal transmitted. Hence, in prior art the wireless device is configured to receiving the first synchronization signal. Thus the wireless device assumes and/or knows that the synchronization signal is transmitted.

According to embodiments herein, the wireless device is configured to attempting to receive first synchronization signal. This means that the wireless device according to embodiments herein is prepared that the first synchronization signal may not be transmitted.

According to some example embodiments herein, a search space for a physical control channel is determined based on a receiving attempt of one or more synchronization signals. A wireless device is configured with one or more first search spaces and one or more second search spaces of one or more physical control channels, wherein each first and second search spaces are associated with first and second synchronization signals, respectively. The wireless device determines one or more search spaces to perform blind decoding attempts based on a receiving attempt of said first synchronization signals.

If the receiving attempt is successful for a first synchronization signal the wireless device determines a first search space associated with the received first synchronization signal. If the receiving attempt is un-successful, i.e. the wireless device did not find any first synchronization signal, the wireless determines a second search space associated with the received second synchronization signals.

In some example embodiments, if the receiving attempt is successful for one or more said first synchronization signals the wireless device determines a search space comprising a union of first search spaces associated with the received first synchronization signals. In such embodiments the determined search space comprises the search space entries belonging to at least one of first search spaces. If the receiving attempt is un-successful, i.e. the wireless device did not find any first synchronization signal, the wireless determines a search space comprising a union of said second search spaces associated with the received second synchronization signals. A union of two sets A and B is the set of entries that are members of A and/or B.

At a blind decoding attempt the wireless device obtains a synchronization state based on the receiving attempt of first synchronization signals wherein the obtained synchronization state is used in a demodulation method of the blind decoding attempt.

Performing decoding attempts will consume a lot of resources in the wireless device and embodiments herein provides a more efficient method to send control messages to the wireless device which will reduce battery consumption and/or reduce the number of un-necessary decoding attempts such as failed decoding attempts due to that no DCI was transmitted.

Figure 2:
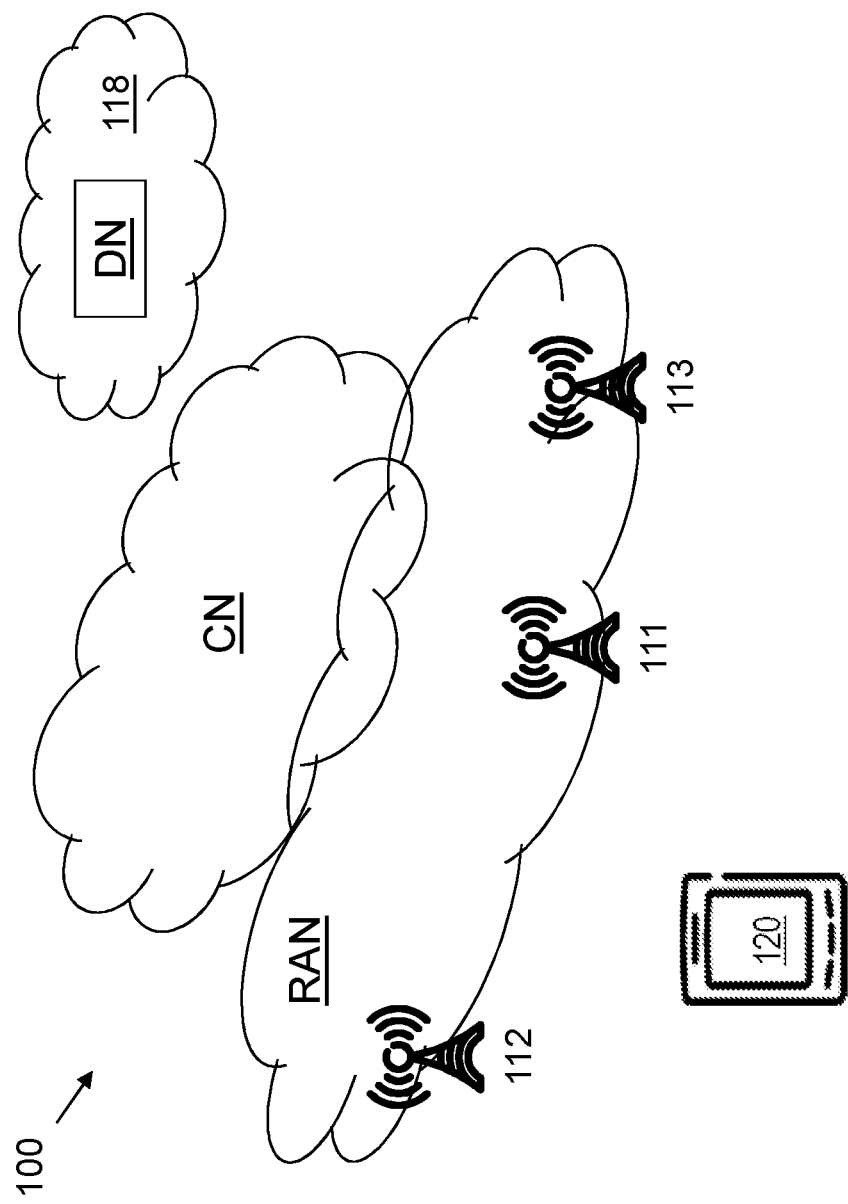
FIG. 2 is a schematic block diagram illustrating embodiments of a communications network.

FIG. 2 depicts an example of a wireless communications network 200 in which embodiments herein may be implemented. The wireless communication network 100 comprises one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

A number of network nodes operate in the wireless communication network 100 whereof a first network node 111, a second network node 112 and a third network node 113 are depicted in FIG. 2. The network nodes 111, 112, 113 provide radio coverage over a respective geographical area, which may also be referred to as a beam or a beam group of a radio access technology (RAT), such as 5G, LTE, Wi-Fi or similar. The respective network node 111, 112, 113 may be a transmission and reception point e.g. a radio access network node such as a Wireless Local Area Network (WLAN) access point or an Access Point Station (AP STA), an access controller, a base station, e.g. a base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by any of the network nodes 111, 112, 113 depending e.g. on the first radio access technology and terminology used. In some embodiments, the network nodes 111, 112, 113 may communicates with Downlink (DL) transmissions to a wireless device 120 and Uplink (UL) transmissions from the wireless device 120. Any of the network node 111, 112, 113 may further be a wireless device acting as a network node such as e.g. a base station. Some actions in methods herein are performed by any of the network nodes 111, 112, 113. As an alternative, any Distributed Node (DN) and functionality, e.g. comprised in a cloud 118 may be used for performing these actions.

In the wireless communication network 100, wireless devices operate such as e.g. the wireless device 120 depicted in FIG. 2. The wireless device 120 may be a UE, mobile station, a non-access point (non-AP) STA, a STA, a user equipment and/or a wireless terminals, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

According to an example scenario, the wireless device 120 is in dual-connectivity mode with the first network node 111 and the second network node 112 in the meaning that both network nodes are capable of transmitting data to the wireless device 120.

Figure 3:
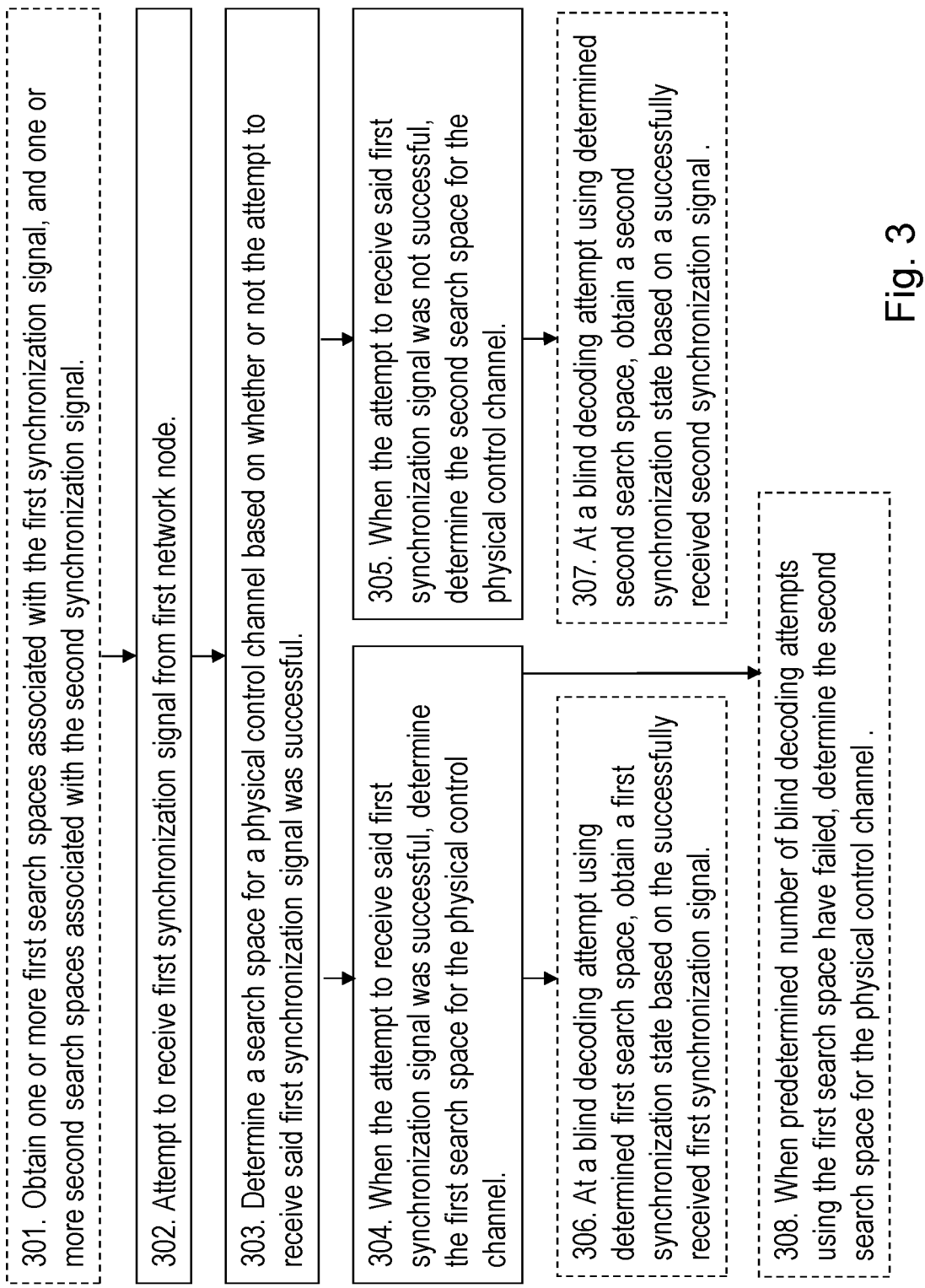
FIG. 3 is a flowchart depicting embodiments of a method in a wireless device.

Example embodiments of a method performed by the wireless device 120 for determining a search space for a physical control channel in the wireless communications network 100 will be described in a general way with reference to a flowchart depicted in FIG. 3. After this a more detailed explanation and exemplification follows.

The wireless device 120 is configured with a first search space of a physical control channel which first search space is associated with a first synchronization signal.

The wireless device 120 may further be configured with the second search space of a physical control channel, which physical control channel may be the same physical control channel as mentioned above or another, different physical control channel. The second search space may be associated with a second synchronization signal.

The method comprises the following actions, which actions may be taken in any suitable order. Actions that are optional are presented in dashed boxes in FIG. 3.

Action 301

As mentioned above, the wireless device 120 may be configured with one or more first search spaces and one or more second search spaces of one or more physical control channels, wherein each first and second search spaces are associated with first and second synchronization signals, respectively.

Thus the wireless device 120 may obtain one or more first search spaces associated with the first synchronization signal, and one or more second search spaces associated with the second synchronization signal. The one or more first search spaces and one or more second search spaces may be obtained in one or more configuration messages.

E.g. the first network node 111 may provide configuration for first search space. The first network node 111, the second network node 112 or any other network node may provide configuration for second search space. The second search space may be given by a specification while first search space may be given by a configuration message.

Action 302

According to an example scenario, the wireless device is configured to attempting to receive first synchronization signal. This means that the wireless device according to embodiments herein is prepared that the first synchronization signal may not be transmitted.

Thus the wireless device 120 attempts to receive the first synchronization signal from the first network node 111.

Action 303

According to, embodiments herein, the wireless device 120 then determines a search space for a physical control channel based on whether or not the attempt to receive said first synchronization signal was successful. When the attempt to receive said first synchronization signal was successful, the wireless device 120 performs Action 304 and when the attempt to receive said first synchronization signal was not successful, the wireless device 120 performs Action 305 below.

Action 304

According to embodiments herein, the wireless device 120 only determines the first search space for the physical control channel if it really succeeds with receiving the first synchronization signal, which is the case in this action.

When the attempt to receive said first synchronization signal was successful, the wireless device 120 determines the first search space for the physical control channel.

The first search space may be determined for performing a blind decoding attempt, which blind decoding attempt may comprise one or more decoding attempts.

The first search space may in some embodiments be based on the first synchronization signal.

Action 305

As mentioned above, the wireless device 120 only determines the first search space for the physical control channel if it really succeeds with receiving the first synchronization signal, but in this action it did not succeeded.

When the attempt to receive said first synchronization signal was not successful, the wireless device 120 determines a second search space for any one or more out of: the physical control channel and a second physical control channel.

The second search space may be determined for performing a blind decoding attempt. The blind decoding attempt may comprise one or more decoding attempts.

Thus, any one or more out of the first search space and the second search space, may be determined for performing a blind decoding attempt such as one or more decoding attempts.

The determining of the second search space may further comprise determining that the second search space is empty.

The determined second search space may be based on a successfully received second synchronization signal.

Action 306

At a blind decoding attempt using the determined first search space, the wireless device 120 may obtain a first synchronization state based on the successfully received first synchronization signal such as e.g. SS1. The first synchronization state may be used in a demodulation method of a decoding attempt on an entry of the determined first search space of said physical control channel.

Action 307

At a blind decoding attempt using the determined second search space, the wireless device 120 may obtain a second synchronization state based on a successfully received second synchronization signal such as a second synchronization signal denoted SS2 below. The said second synchronization state may be used in a demodulation method of a decoding attempt on an entry of the determined second search space of said physical control channel.

Action 308

It may be decided that only a predetermined number of blind decoding attempts may be used. This is since the time budget for the blind detection procedure needs to be short enough for the specified time budget. In such embodiments a pre-determined sub-set of the search space may be used. For example, only certain aggregation levels are used, for example, only 2 and 8 instead of 1, 2, 4, and 8.

When the predetermined number of blind decoding attempts using the determined first search space has failed, the wireless device 120 optionally determines the second search space for the physical control channel.

The first synchronization signal may comprise one or more first synchronization signals such as SS11 and SS12 described below. The second synchronization signal may comprise one or more second synchronization signals.

Further, the first search space may comprise one or more first search spaces such as S11 and S12 described below. The second search space may comprise one or more second search spaces.

Embodiments herein may comprise any one or more out of:

The first synchronization signal SS1 is transmitted by a first network node 111.

One first synchronization signal SS11 out of the one or more first synchronization signals is transmitted by the first network node 111 and another first synchronization signal SS12 out of the one or more first synchronization signals is transmitted by a third network node 112.

The second synchronization signal SS2 is transmitted by a second network node 112.

The first network node 111, second network node 111 being the same network node.

The first network node 111, second network node 111 and third network node 111 being the same network node.

Embodiment's herein will now be further described and exemplified. The text below is applicable to and may be combined with any suitable embodiment described above.

Figure 4:
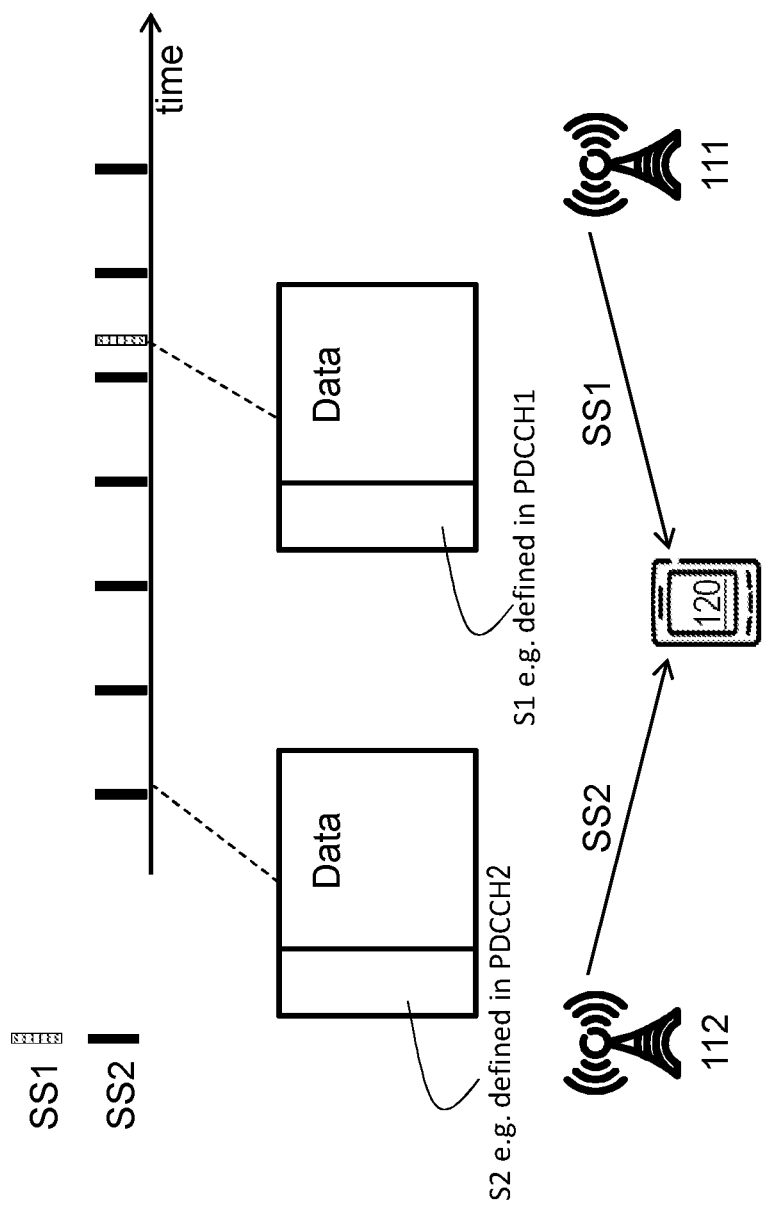
FIG. 4 is a schematic block diagram illustrating embodiments of a communications network.

FIG. 4 illustrates a first example scenario according to embodiments herein. In the example scenario, the wireless device 120 is configured with a first search space S1 associated with a first synchronization signal SS1. The first search space S1 may be defined for a first control channel PDCCH1. A DCI comprising an assignment may be found in an entry x1 of the first search space. A search space entry is a possible format and a possible location where the assignment may be sent, i.e. a format and a location of the first control channel PDCCH1 may be found. Note that an assignment is control information, the DCI comprise the assignment. The wireless device 120 is further configured with a second search space S2 associated with a second synchronization signal SS2. The second search space S2 may be defined for a second control channel PDCCH2. A DCI may be found in an entry x2 of the second search space. According to some embodiments herein, S2 may be used when no SS1 is present. Please note that S2 and S1 before the Data in FIG. 4 is used for the control channels, i.e. not that the search space is sent on the control channels PDCCH1 and PDCCH2.

In the example scenario, the second network node 112 transmits the second synchronization signal SS2 periodically with a large periodicity which enables the wireless device 120 to receive assignments from the second network node 112 in the configured second search space S2. In the configured second search space S2 an assignment assigns data transmissions to the wireless device. The wording assignment when used herein means an instruction for the wireless device 120 to receive a transmission or perform a transmission.

In the example scenario, the first network node 111 utilizes the first search space S1 to transmit assignments to the wireless device 120 for assigning a data transmission to the wireless device 120.

The wireless device 120 is hence in dual-connectivity mode with the first network node 111 and the second network node 112 in the meaning that both network nodes are capable of transmitting data to the wireless device 120.

In this example scenario, the first network node 111 has only sporadically data to transmit to the wireless device 120 while the second network node 112 has data more regularly, which transmissions, for simplicity reasons, are omitted from FIG. 4. Therefore, the first network node 111 only transmits the first synchronization signal SS1 when the first network node 111 needs to transmit data to wireless device 120. To limit the complexity in the wireless device, it is configured to use embodiments herein such that it only search for, such as blind decode, assignments on the first search space S1 if it finds the first synchronization signal SS1.

Figure 5:
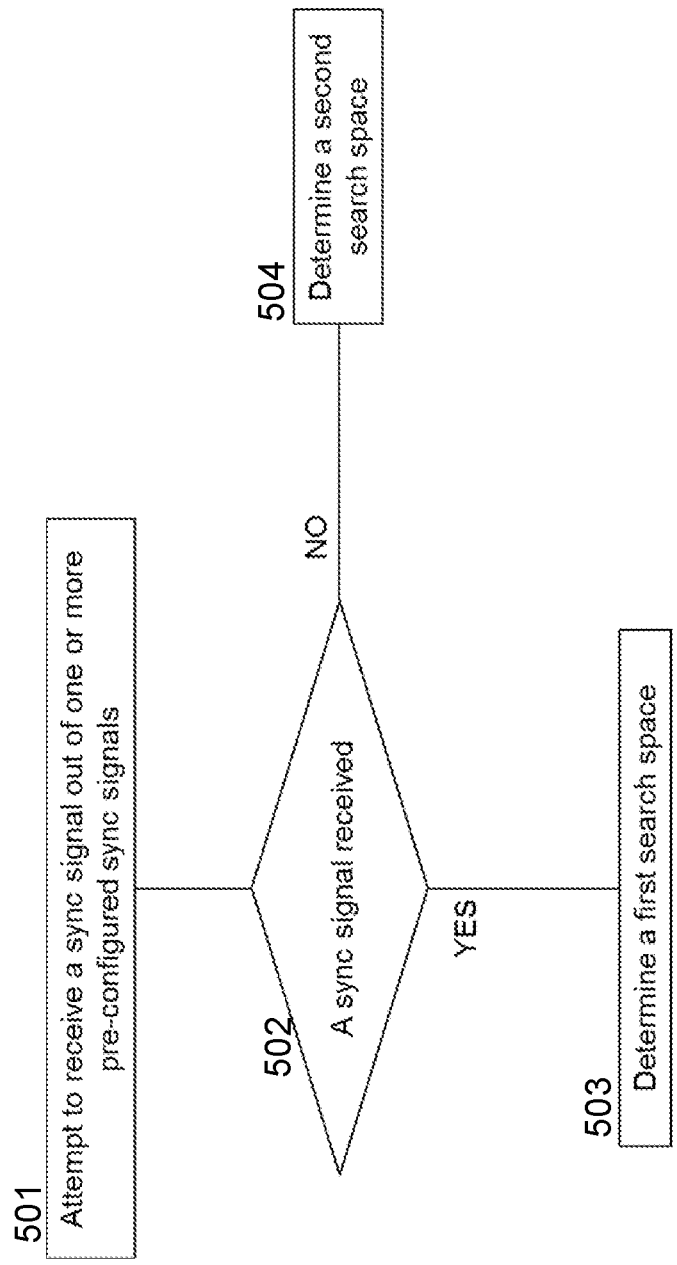
FIG. 5 is a flowchart depicting embodiments of a method in a wireless device.

As described above the wireless device 120 implementing an example embodiment herein performs the Actions in the flowchart illustrated in FIG. 5.

The wireless device 120 attempts 501 to receive a synchronization (sync) signal such as the first synchronization signal, out of one or more preconfigured synchronization signals such as the configured one or more first synchronization signals.

When the synchronization signal such as the first synchronization signal was successfully received 502, determine 503 the first search space.

When the synchronization signal such as the first synchronization signal was not successfully received 502, determine 504 the second search space.

Figure 6:
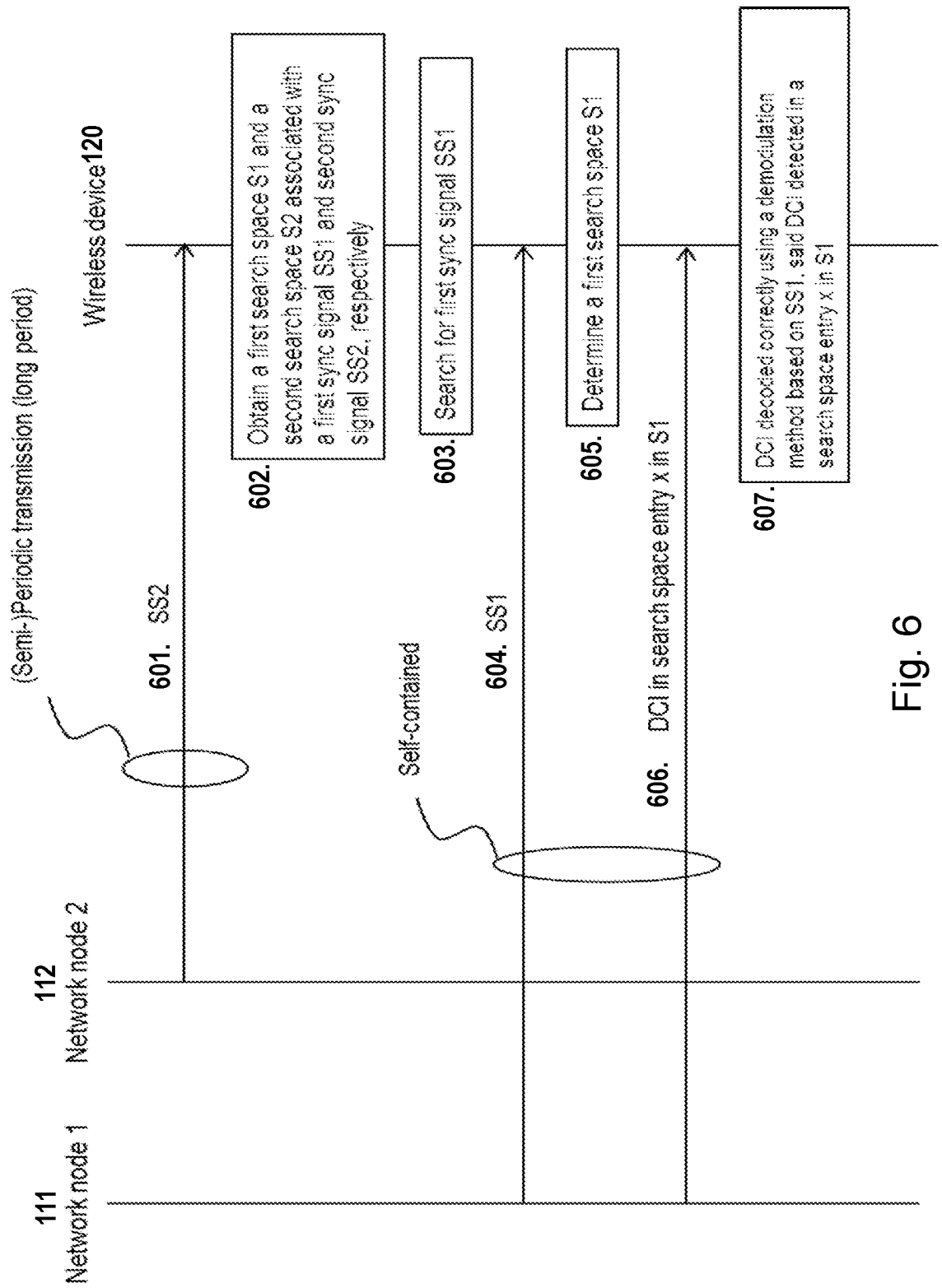
FIG. 6 is a signalling diagram depicting embodiments of a method.
Figure 7:
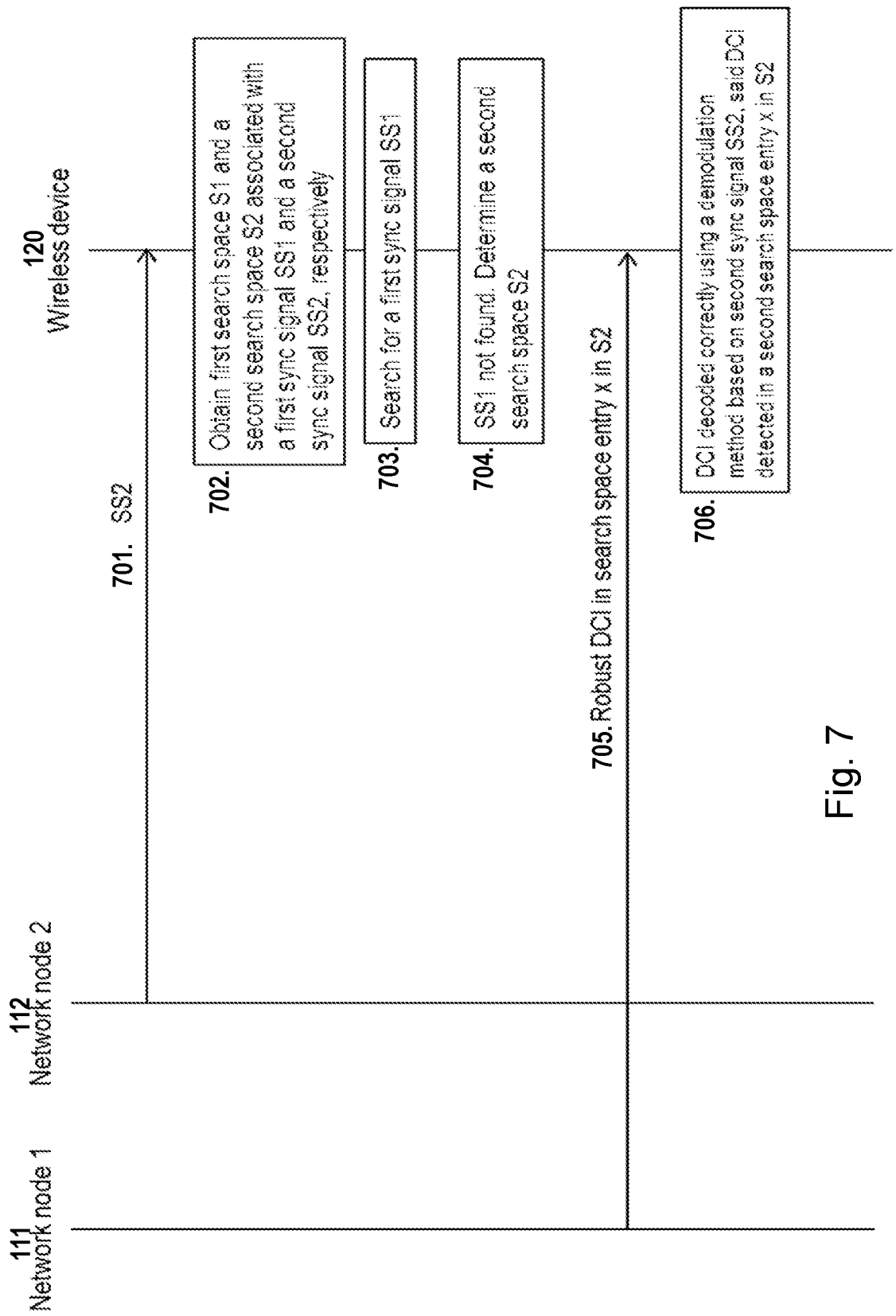
FIG. 7 is a signalling diagram depicting embodiments of a method.
Figure 8:
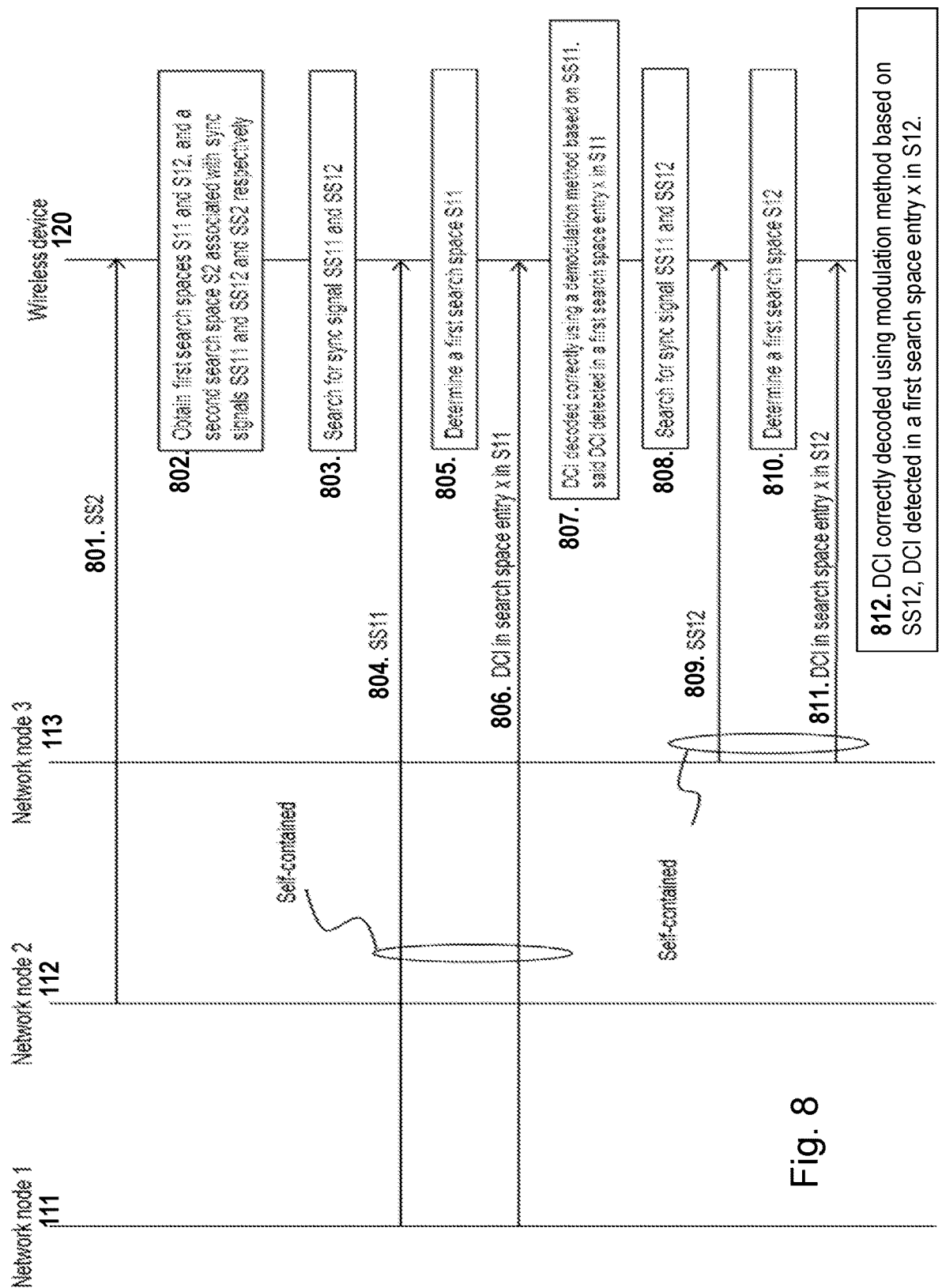
FIG. 8 is a signalling diagram depicting embodiments of a method.

Note that FIG. 6-8 illustrates events happening with respect to time between devices with increasing time downwards.

Example Embodiment of Determining a First Search Space

This embodiment e.g. relates to Action 304 and 306 above and is illustrated in FIG. 6

Action 601. In this embodiment the second network node 112 denoted Network node 2 in FIG. 6, transmits system information semi-periodically out in a coverage area of the second network node 112. Semi-periodically means that the time between two transmissions may vary, but the variation is limited to a certain range. For example, time between two transmission may be 100 ms±5 ms. The system information transmissions also comprise a synchronization signal SS2 to enable reception of the system information transmissions. Within the coverage area of the second network node 112 there is also other nodes such as the first network node 111, denoted Network node 1 in FIG. 6.

Action 602. As mentioned above in Action 301, the wireless device 120 may obtain one or more first search spaces associated with the first synchronization signal, and one or more second search spaces associated with the second synchronization signal.

The wireless device 120 may obtain such as deduce an association between a first search space S1 and a first synchronization signal SS1, and an association between a second search space S2 and the second synchronization signal SS2, from the system information sent by the second network node 112. As an alternative, the wireless device 120 may obtain such as deduce an association between the first search space S1 and the first synchronization signal SS1 from a dedicated configuration message and an association between a second search space S2 and the second synchronization signal SS2, from system information sent in to the wireless device 120 from the second network node 112 or any other network node. An association between a second search space S2 and the second synchronization signal SS2 may also be obtained from specification possibly also depending of the type/class and/or so-called transmission mode of the wireless device. The coverage area of the first network node 111 is smaller than the coverage area of the second network node 112. Therefore, in this example scenario, for complexity and resource consumption reason, no periodic synchronization signal is transmitted from the first network node 111 unless the wireless device 120 is in coverage area of the first network node 111 and when assignments need to be transmitted.

Action 603. As mentioned above in Action 302, the wireless device 120 attempts to receive first synchronization signal from first network node 111. The wireless device 120 thus searches for the first synchronization signal according to the embodiment. This means that the wireless device 120 is configured to only search for assignments on the first search space S1, which is the search space used by the first network node 111, if it detects the first synchronization signal SS1.

Action 604. In this example scenario, the attempt to receive said first synchronization signal SS1 was successful. This relates to above mentioned Action 304.

Action 605. Since the attempt to receive said first synchronization signal was successful, the wireless device 120 determines the first search space for the physical control channel. Also this relates to above mentioned Action 304.

Action 606. The first network node 111 sends system information such as DCI in the first search space S1 such as in entry x of the first search space to be received by the wireless device 120. The DCI is carried by the control channel, where the control channel is sent within a search space entry. The first synchronization signal and transmitted DCI in first search space is hence self-contained in the sense that they together provide all information needed, and only when it is needed, by the wireless device to receive the assignment.

Since the wireless device 120 really has detected the first synchronization signal SS1, and determined to search for assignments on the first search space S1, the wireless device 120 performs the search for assignments on the first search space S1.

Action 607. As mentioned above in Action 306, at a blind decoding attempt using determined first search space, the wireless device 120 obtains a first synchronization state based on the successfully received first synchronization signal. In this embodiment, the wireless device 120 decodes the control information such as the DCI correctly by using the obtained a first synchronization state in SS1. The control information such as the DCI is e.g. detected in the entry x of the first search space.

Example Embodiment of Determining a Second Search Space

This embodiment e.g. relates to Action 305 and 307 above and is illustrated in FIG. 7 This embodiment is similar to the embodiment in the previous section, but here the first network node 111 denoted Network node 1 in FIG. 7, decides to transmit an assignment to the wireless device 120 without also transmitting a first synchronization signal SS1. The second network node 112 is denoted network node 2 in FIG. 7. The Actions 701-703 are similar as the embodiment above and corresponds to respective Action 601-603.

Action 704. In this example scenario, the attempt to receive said first synchronization signal was not successful. Since the attempt to receive said first synchronization signal was not successful, the first wireless device 120 determines the second search space for the physical control channel. This relates to above mentioned Action 305.

Action 705. Since the first network node 111 has decided to transmit an assignment comprised in a DCI to the wireless device 120 without also transmitting the first synchronization signal SS1. This may be accomplished using a robust transport format for the assignment, i.e. performing a conservative encoding of the DCI comprising the assignment. The wireless device 120 has a synchronization to the second network node 112. This results in this example scenario that also a rough synchronization also to the first network node 111 is given since it is located within the coverage area of the second network node 112. In this example scenario, the first network node 111 needs to transmit the assignment in an entry of the second search space S2 since the wireless device 120 will only attempt to receive assignments in entries on the first search space S1 if it finds SS1 which is not the case here.

Thus the first network node 111 sends control information such as DCI in the second search space S2 such as in entry x of the second search space S2 to be received by the wireless device 120. The first network node 111 is aware of the second search space since the first network node 111 and the second network node 112 may be controlled by the same control entity or may be cooperating or may be configured from an Operation and Maintenance Module (OMM).

Since the wireless device 120 has determined to search for assignments on the second search space S2, it performs the search for assignments on the second search space S2.

Action 706. As mentioned above in Action 307, at a blind decoding attempt using determined second search space, the wireless device 120 obtains a second synchronization state based on a successfully received second synchronization signal. In this embodiment, the wireless device 120 decodes the control information such as the DCI correctly by using the obtained second synchronization state in SS2. The control information such as the DCI is e.g. detected in the entry x of the second search space S2.

Example Embodiment of a Handover Between Two First Search Spaces

This embodiment e.g. relates to Action 304 and 306 above and is illustrated in FIG. 8. In this embodiment yet another network node such as the third network node 113, denoted Network node 3 in FIG. 8, is introduced in the coverage area of the second network node 112 denoted Network node 2 in FIG. 8.

Action 801. In this embodiment the second network node 112 transmits a second synchronization signal SS2 semi-periodically out in a coverage area of the second network node 112. The second synchronization signal SS2 is associated with a second search space.

Action 802. As mentioned above in Action 301, the wireless device 120 may obtain one or more first search spaces associated with the first synchronization signal, and one or more second search spaces associated with the second synchronization signal. As further mentioned above, the first synchronization signal may comprise one or more first synchronization signals such as SS11 and SS12 described in this embodiment and the first search space may comprises one or more first search spaces such as S11 and S12 described in this embodiment.

Thus, for this embodiment the wireless device 120 is configured with two first search spaces S11 and S12 associated with two first synchronization signals SS11 and SS12, respectively. This means that the wireless device 120 is configured with the first search spaces S11 associated with the first synchronization signal SS11, and the wireless device 120 is further configured with the first search spaces S12 associated with the first synchronization signal SS12. In addition the wireless device 120 is configured with a second search space S2 associated with synchronization signal SS2. The wireless device 120 is further configured to find assignments on S11 and/or S12 if it finds synchronization signals SS11 and/or SS12. The obtaining may performed in a similar way as described in Action 602.

Action 803. The wireless device 120 searches for the first synchronization signals SS11 and/or SS12.

Action 804. In this example scenario, the attempt to receive said first synchronization signal SS11 was successful. This relates to above mentioned Action 304.

Action 805. Since the attempt to receive said first synchronization signal SS11 was successful, the wireless device 120 determines the first search space S11 for the physical control channel. Also this relates to above mentioned Action 304.

Action 806. The first network node 111 sends control information such as DCI in the first search space S11 such as in entry x of the first search space to be received by the wireless device 120. Since the wireless device 120 really has detected the first synchronization signal SS11, and determined to search for assignments on the first search space S11, the wireless device 120 performs the search for assignments on the first search space S11.

Action 807. As mentioned above in Action 306, at a blind decoding attempt using determined first search space S11, the wireless device 120 obtains a first synchronization state based on the successfully received first synchronization signal SS11. In this embodiment, the wireless device 120 decodes the control information such as the DCI correctly by using the obtained a first synchronization state in SS11. The control information such as the DCI is e.g. detected in the entry x of the first search space S11.

Action 808. The wireless device 120 continues to search for the first synchronization signals SS11 and/or SS12 to receive further assignments, e.g. control information such as further DCIs. This is to be able to transmit further assignments to the wireless device using first search spaces.

Action 809. At this time in this example scenario, the attempt to receive said first synchronization signal SS12 was successful. This relates to above mentioned Action 304. The first synchronization signal SS12 was transmitted by the third network node 113.

Action 810. Since the attempt to receive said first synchronization signal SS12 was successful, the wireless device 120 determines the first search space S12 for the physical control channel. Also this relates to above mentioned Action 304.

Action 811. The third network node 113 sends control information such as DCI in the first search space S12 such as in entry x of the first search space S12 to be received by the wireless device 120. Note that 809 is the sync signal and 811 is the assignment in the DCI. But, 809 and 811 are sent self-contained, i.e. needed info when it is the info is needed. Since the wireless device 120 really has detected the first synchronization signal SS12, and determined to search for assignments on the first search space S12, the wireless device 120 performs the search for assignments on the first search space S12.

Action 812. As mentioned above in Action 306, at a blind decoding attempt using determined first search space S12, the wireless device 120 obtains a first synchronization state based on the successfully received first synchronization signal SS12. In this embodiment, the wireless device 120 decodes the control information such as the DCI correctly by using the obtained a first synchronization state in SS12. The control information such as the DCI is e.g. detected in the entry x of the first search space S12. Now a transition from receiving assignments from the first network node 111 to receiving assignments from the third network node 113 is performed.

Thus according to this embodiments herein, a handover from search space SS11 used by the first network node 111 to a search space SS12 used by the third network node 113 is enabled as illustrated in FIG. 8. It should be noted here that the embodiment enables that the wireless device 120 only need to perform decoding attempts for a single search space during the transition from receiving assignments from the first network node 111 to receiving assignments from the third network node 113.

The wireless device 120 may prioritize when having multiple first search spaces. In the handover, the wireless device 120 may e.g. first try to find assignments on S12 and only if no assignments was found on S12 try to find assignments on S11 although both first synchronization signals SS11 and SS12 was received.

Example Embodiment of Periodic Optional Synchronization Signal

In some embodiments the first and second synchronization signals actually originates from the same source, but have a different age. In some embodiments the first network node 111 may send synchronization signals rather frequently but may choose not to do so in given occasions. The wireless device 120 may then determine the search space to use based on the time since the last received synchronization signal. The entries for blind decoding in the search space may thus vary depending on the time instance for the blind decoding attempts relative to time of the last received synchronization signal, were said synchronization may be both the first and the second synchronization signal.

Example Embodiment of Determining Search Space Size

In some embodiments a determined first search space comprises a strict subset of a determined second search space. A subset of a determined second subset means that some entries in second subset are not members of the subset. This may be beneficial when the wireless device 120 has a limit on number of blind decoding attempts it can perform.

Figure 9:
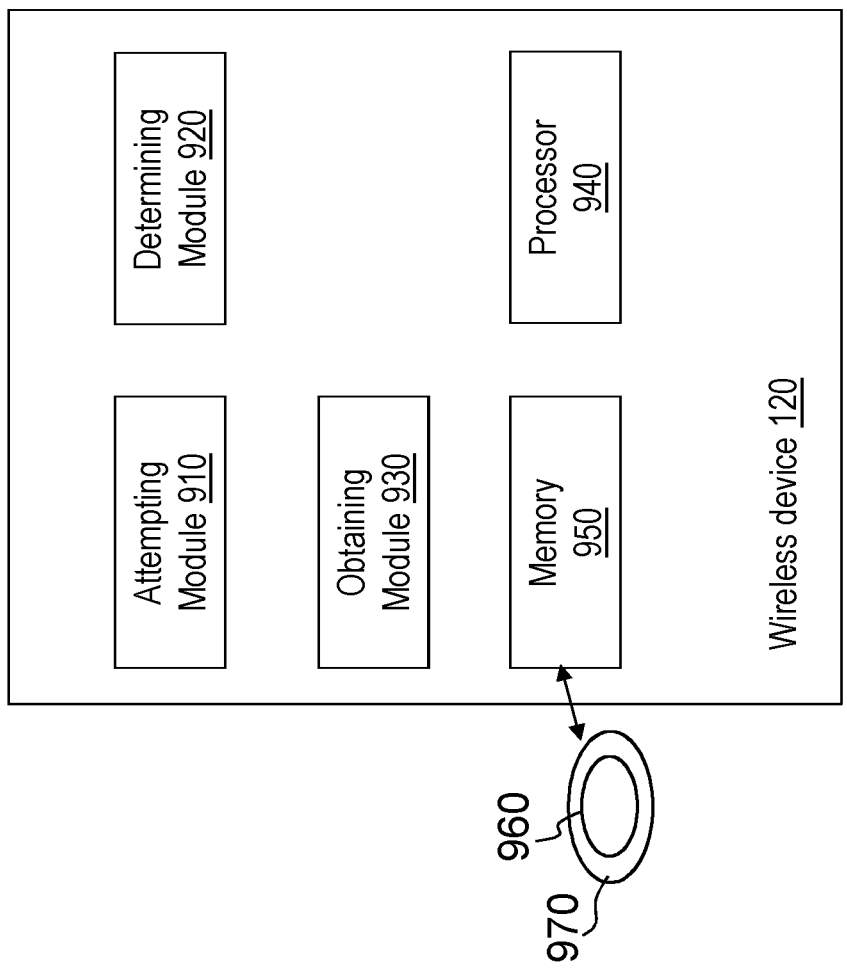
FIG. 9 is a schematic block diagram illustrating embodiments of a wireless device.

To perform the method actions for determining a search space for a physical control channel in the wireless communications network 100, the wireless device 120 may comprise the following arrangement depicted in FIG. 9.

As mentioned above, the wireless device 120 is configured with a first search space of a physical control channel which first search space is associated with a first synchronization signal.

The wireless device 120 may further be configured with a second search space of the physical control channel or another physical control channel. The second search space may be associated with a second synchronization signal.

The wireless device 120 is configured to, e.g. by means of an attempting module 910 comprised in the wireless device 120 and being configured to, attempt to receive from a first network node 111, the first synchronization signal.

The wireless device 120 is further configured to, e.g. by means of a determining module 920 comprised in the wireless device 120 and being configured to, determine a search space for a physical control channel based on whether or not the attempt to receive said first synchronization signal was successful.

The wireless device 120 is further configured to, e.g. by means of the determining module 920 comprised in the wireless device 120 and being configured to, determine a first search space for the physical control channel, when the attempt to receive said first synchronization signal was successful. The first search space may be based on the first synchronization signal.

The wireless device 120 is further configured to, e.g. by means of the determining module 920 comprised in the wireless device 120 and being configured to, determine a second search space for any one or more out of: the physical control channel and a second physical control channel, when the attempt to receive said first synchronization signal was not successful.

In some embodiments, any one or more out of the first search space and the second search space, are to be determined for performing a blind decoding attempt.

In some embodiments, the determined second search space is to be based on a successfully received second synchronization signal.

The wireless device 120 may further be configured to, e.g. by means of the determining module 920 comprised in the wireless device 120 and being configured to, when a pre-determined number of blind decoding attempts using the determined first search space have failed, determine the second search space for the physical control channel.

The wireless device 120 may further be configured to, e.g. by means of an obtaining module 930 comprised in the wireless device 120 and being configured to, obtain one or more first search spaces associated with the first synchronization signal, and one or more second search spaces associated with the second synchronization signal.

The wireless device 120 may further be configured to, e.g. by means of the obtaining module 930 comprised in the wireless device 120 and being configured to, obtain the one or more first search spaces and one or more second search spaces, in one or more configuration messages.

The wireless device 120 may further be configured to, e.g. by means of the obtaining module 930 comprised in the wireless device 120 and being configured to, at a blind decoding attempt using the determined first search space, obtain a first synchronization state based on the successfully received first synchronization signal such as SS1. The first synchronization state may be used in a demodulation method of a decoding attempt on an entry of the determined first search space of said physical control channel.

The wireless device 120 may further be configured to, e.g. by means of the obtaining module 930 comprised in the wireless device 120 and being configured to, at a blind decoding attempt using the determined second search space, obtain a second synchronization state based on a successfully received second synchronization signal SS2. The second synchronization state is to be used in a demodulation method of a decoding attempt on an entry of the determined second search space of said physical control channel.

The first synchronization signal may be adapted to comprise one or more first synchronization signals such as e.g. SS11, SS12: The second synchronization signal may be adapted to comprise one or more second synchronization signals.

The first search space may be adapted to comprise one or more first search spaces such as e.g. S11, S12 and the second search space is adapted to comprise one or more second search spaces.

Embodiments herein may comprise any one or more out of:

The first synchronization signal SS1 is adapted to be transmitted by a first network node 111.

One first synchronization signal SS11 out of the one or more first synchronization signals is adapted to be transmitted by the first network node 111 and another first synchronization signal SS12 out of the one or more first synchronization signals is adapted to be transmitted by a third network node 112.

The second synchronization signal SS2 is adapted to be transmitted by a second network node 112.

The first network node 111, second network node 111 being the same network node.

The first network node 111, second network node 111 and third network node 111 being the same network node.

The embodiments herein for determining a search space for a physical control channel in the wireless communications network 100 may be implemented through one or more processors, such as a processor 940 of a processing circuitry in the wireless device 120 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 950 comprising one or more memory units. The memory 940 comprises instructions executable by the processor 940.

The memory 950 is arranged to be used to store e.g. information about configurations, assignments, resources, data, and applications to perform the methods herein when being executed in the wireless device 120.

In some embodiments, a computer program 960 comprises instructions, which when executed by the at least one processor 940, cause the at least one processor 940 to perform actions according to any of the Actions 301-308, 601-607, 701-706, and 801-812.

In some embodiments, a carrier 970 comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the wireless device 120, described above may refer to a combination of analog and digital circuits, and/or one or more processors configured with software and/or firmware, e.g. stored in the memory 950, that when executed by the one or more processors such as the processor 940 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

ABBREVIATIONS

3GPP Third Generation Partnership Project
eNB Enhanced NodeB
CQI Channel-Quality Indicator CRS Cell-Specific Reference Symbol
CSI Channel-State Information
CSI-IM CSI Interference Measurement
CSI-RS CSI Reference Symbol
DCI Downlink Control Information
HARQ Hybrid Automatic Repeat-reQuest
LTE Long Term Evolution
MAC Medium Access Control
MCS Modulation and Coding Scheme
MI Mutual Information
MIMO Multiple Input Multiple Output
NDI New Data Indicator
(e)PDCCH (enhanced) Physical Downlink Control Channel
PDU Protocol Data Unit
PMI Pre-coding Matrix Indicator
PRB Physical Resource Block
RI Rank Indicator
RV Redundancy Version
RRC Radio Resource Control
TM Transmission Mode
TTI Transmission Time Interval
UE User Equipment

The invention claimed is:

1. A method performed by a wireless device for determining a search space for a physical control channel in a wireless communications network, which wireless device is configured with a first search space of a physical control channel which first search space is associated with a first synchronization signal, the method comprising:
attempting to receive from a first network node, the first synchronization signal,
determining a search space for a physical control channel based on whether or not the attempt to receive said first synchronization signal was successful, and
when the attempt to receive said first synchronization signal was successful determining a first search space for the physical control channel,
when the attempt to receive said first synchronization signal was not successful determining a second search space for any one or more out of: the physical control channel and a second physical control channel.

2. The method according to claim 1, wherein the wireless device further is configured with the second search space of a physical control channel.

3. The method according to claim 1, wherein the second search space is associated with a second synchronization signal.

4. The method according to claim 1, wherein any one or more out of the first search space and the second search space, are determined for performing a blind decoding attempt.

5. The method according to claim 1, wherein the first search space is based on the first synchronization signal.

6. The method according to claim 1, further comprising:
obtaining one or more first search spaces associated with the first synchronization signal, and one or more second search spaces associated with the second synchronization signal.

7. The method according to claim 6, wherein the one or more first search spaces and one or more second search spaces are obtained in one or more configuration messages.

8. The method according to claim 1, further comprising:
at a blind decoding attempt using the determined first search space, obtaining a first synchronization state based on the successfully received first synchronization signal, wherein said first synchronization state is used in a demodulation method of a decoding attempt on an entry of the determined first search space of said physical control channel.

9. The method according to claim 1, further comprising:
when a predetermined number of blind decoding attempts using the determined first search space have failed, determining the second search space for the physical control channel.

10. The method according to claim 1, wherein determining a second search space further comprises determining that the second search space is empty.

11. The method according to claim 1, wherein the determined second search space is based on a successfully received second synchronization signal.

12. The method according to claim 1, further comprising:
at a blind decoding attempt using the determined second search space, obtaining a second synchronization state based on a successfully received second synchronization signal, wherein said second synchronization state is used in a demodulation method of a decoding attempt on an entry of the determined second search space of said physical control channel.

13. The method according to claim 1, wherein the first synchronization signal comprises one or more first synchronization signals and wherein the second synchronization signal comprises one or more second synchronization signals.

14. The method according to claim 1, wherein the first search space comprises one or more first search spaces and wherein the second search space comprises one or more second search spaces.

15. The method according to claim 1, further comprising any one or more out of:
the first synchronization signal is transmitted by a first network node,
one first synchronization signal out of the one or more first synchronization signals is transmitted by the first network node and another first synchronization signal out of the one or more first synchronization signals is transmitted by a third network node,
the second synchronization signal is transmitted by a second network node,
the first network node, second network node being the same network node, and
the first network node, second network node and third network node being the same network node.

16. A non-transitory computer readable storage medium storing computer-executable instructions, which when executed by a processor, cause the processor of a wireless device for determining a search space for a physical control channel in a wireless communications network, which wireless device is configured with a first search space of a physical control channel which first search space is associated with a first synchronization signal, the method comprising:
attempting to receive from a first network node, the first synchronization signal,
determining a search space for a physical control channel based on whether or not the attempt to receive said first synchronization signal was successful, and
when the attempt to receive said first synchronization signal was successful determining a first search space for the physical control channel,
when the attempt to receive said first synchronization signal was not successful determining a second search space for any one or more out of: the physical control channel and a second physical control channel.

17. A wireless device for determining a search space for a physical control channel in a wireless communications network, which wireless device is configured with a first search space of a physical control channel which first search space is associated with a first synchronization signal, the wireless device being configured to:
- attempt to receive from a first network node, the first synchronization signal,
- determine a search space for a physical control channel based on whether or not the attempt to receive said first synchronization signal was successful, and
- determine a first search space for the physical control channel, when the attempt to receive said first synchronization signal was successful, and
- determine a second search space for any one or more out of: the physical control channel and a second physical control channel, when the attempt to receive said first synchronization signal was not successful.

18. The wireless device according to claim 17, wherein the wireless device further is configured with the second search space of a physical control channel.

19. The wireless device according to claim 17, wherein the second search space is associated with a second synchronization signal.

* * * * *